March 4, 1947.　　　B. P. McKINLEY　　　2,416,936
ELECTRICALLY HEATED SOLDERING DEVICE
Filed Feb. 16, 1944
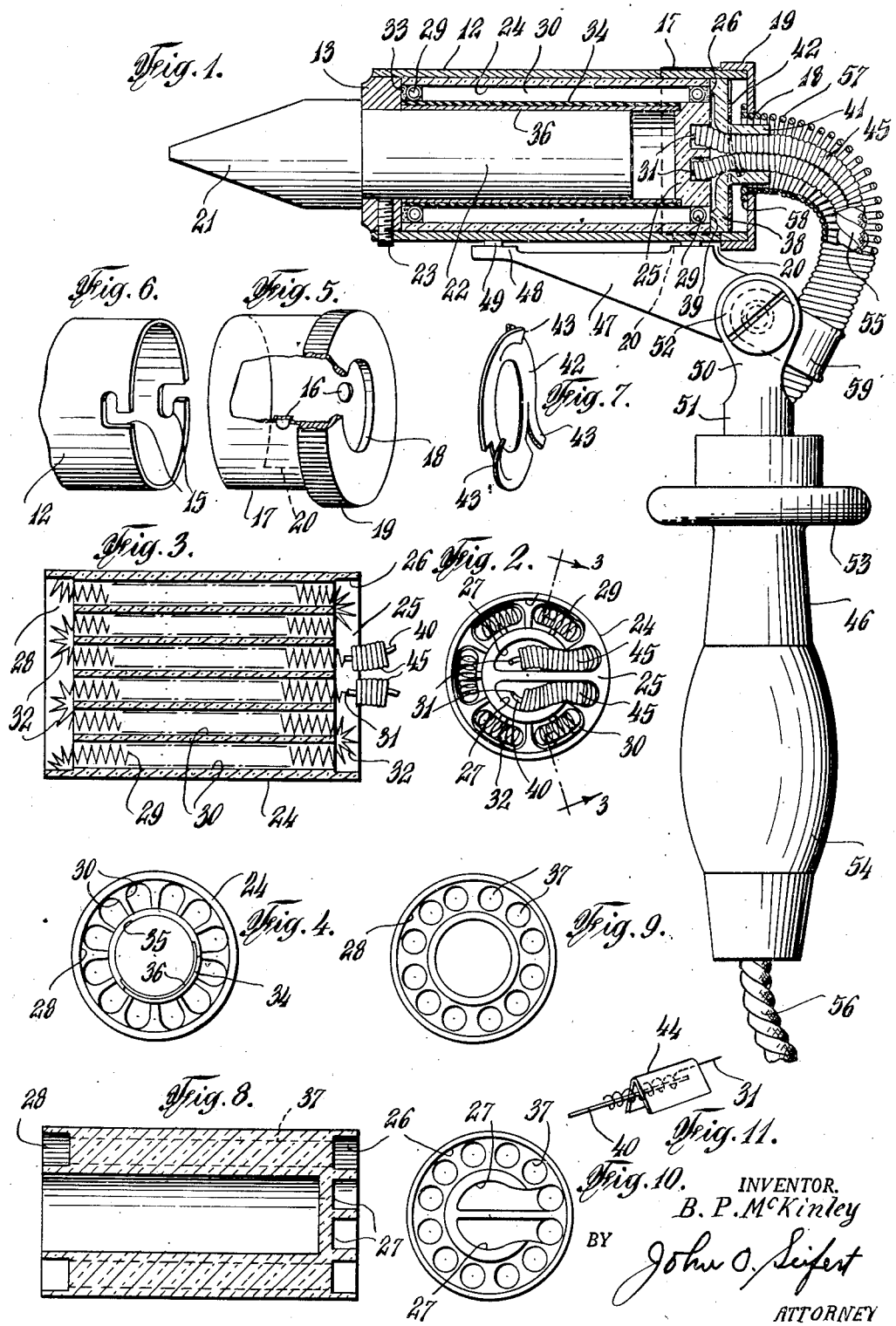
INVENTOR.
B. P. McKinley
BY John O. Seifert
ATTORNEY Patented Mar. 4, 1947

2,416,936

UNITED STATES PATENT OFFICE 2,416,936

ELECTRICALLY HEATED SOLDERING DEVICE

Benjamin P. McKinley, Manatee County, Fla., assignor to McKinley-Mockenhaupt Co., Chicago, Ill., a corporation of Illinois Application February 16, 1944, Serial No. 522,592

3 Claims. (Cl. 219—26)

This invention relates to soldering irons or like devices, and relates particularly to electrically heated devices of this character wherein the soldering bit is arranged at the end of a shank and the shank extended into one end of and supported in a tubular shell or housing with the bit exterior of the shell, and the shell carrying an electric heating unit in surrounding relation to and heating the bit shank and the heat of the bit shank transmitted to and heating the bit.

In electrically heated soldering devices of this character in order that the bit shank will be heated to a sufficiently high temperature to transmit the heat thereof to and heat and maintain the bit tip heated at an effective soldering temperature under load, the bit shank is made relatively bulky and of considerable length with the object of heating the bit shank to and maintaining it at a sufficiently high temperature to assure transmitting the heat thereof to and maintaining the bit tip at a soldering temperature. This increase in the size of the bit shank necessitates an increase in the size of other parts of the device and increase the weight thereof with the result that the user of the soldering iron becomes quickly fatigued and requires frequent rest periods. Furthermore, the bit shank and enclosing shell being of relatively large size there is considerable dissipation of heat by radiation with the result that electric heating units permissible for use in devices of this character are not of a capacity to generate a sufficient amount of heat to heat and maintain the soldering bit at an effective soldering temperature and it is necessary to frequently stop the soldering operation to permit the soldering bit to recover its soldering temperature.

It is an object of the present invention to provide an improved construction and arrangement of soldering device of this character to reduce the size and weight thereof, whereby the soldering device may be used for a considerable length of time without the user becoming fatigued and make it permissible to use an electric heating unit of a capacity capable to generate sufficient heat to heat and maintain the soldering bit at an effective soldering temperature under load.

It is another object of the invention to provide in soldering devices of this character an improved construction and arrangement of electric heating unit and provide an electric heating unit of relatively small size having the capacity to generate sufficient heat to heat the bit shank to and maintain it at a sufficiently high temperature to assure transmitting the heat thereof to and maintain the bit tip at an effective soldering temperature.

Other objects and advantages of the invention will be apparent from the specification.

In the drawing accompanying and forming a part of this application there is shown a soldering iron embodying the invention, wherein Figure 1 is a side elevational view showing the soldering bit carrying housing and elements carried thereby in longitudinal section.

Figure 2 is an end elevation of an electric heating unit forming a part of the device looking at the right of the heating unit as shown in Figure 1.

Figure 3 is a longitudinal sectional view taken substantially on the line 3—3 of Figure 2.

Figure 4 is an end elevation of the electric heating unit looking at the left hand end of the heating unit shown in Figure 1.

Figure 5 is a perspective view of a cap member, partly broken away, adapted to be removably mounted upon an end of the shell or housing.

Figure 6 is a perspective view of an end portion of the shell or housing upon which the cap member shown in Figure 5 is removably mounted.

Figure 7 is a perspective view of a spring washer member adapted to be engaged in the cap member to yieldingly retain the parts in assembled position in the shell.

Figure 8 is a longitudinal sectional view of a modified arrangement of carrier for the heating element of the electric heating unit.

Figure 9 is an end elevation of the carrier for the electric heating element shown in Figure 8 looking at the left thereof.

Figure 10 is an end elevation of the carrier for the electric heating element shown in Figure 8 looking at the right thereof; and Figure 11 is a perspective view showing means for and the manner of electrically connecting the terminals of the electric heating element of the heating unit to an electric current conductor.

In the embodiment of the invention illustrated in the accompanying drawing, there is provided a metallic shell or housing 12 of tubular form having the internal diameter reduced at one end portion by a bushing 13 secured in said end portion, as by sweating, or in any other suitable manner, with the outer end of the bushing projecting from the end of the shell. The opposite end of the shell is arranged with a pair of opposed bayonet joint shaped slots 15, as shown in Figure 6, having an end portion extending axially of the shell opening through the end edge of the shell and the opposite end portion of the slots extending in angular relation thereto for the engagement of nibs 16 pressed inwardly from the material of the skirt portion of a closure cap member 17 adapted to be engaged upon the end of the shell and having a central opening 18 in the base or bottom thereof and an annular protuberance arranged with serrations or notches therein, as shown at 19 in Figures 1 and 5, to facilitate the engagement of the closure cap on the shell and the nibs 16 with the slots 15. The skirt portion of the closure cap 17 is arranged with an opening 20 extending from the edge to the protuberance 19 and disposed intermediate the nibs 16 for a purpose to be hereinafter described.

The shell is particularly adapted to carry a soldering bit 21 of suitable material, such as copper or a copper alloy, having a tapered tip portion and a base portion of large diameter than the opening in the bushing 13, and said bit being arranged integral with and at one end of a shank 22 of slightly smaller diameter than the diameter of the opening in the bushing and of less length than the length of the shell 12, as clearly shown in Figure 1. The soldering bit and shank is supported and releasably retained in the shell bushing 13 by a set screw 23 adjustably mounted in alined screw threaded openings in the shell 12 and bushing 13.

The soldering bit 21 is heated to soldering temperature through the shank 22 by an electric heating unit capable of generating sufficient heat to maintain the shank at a sufficiently high temperature to assure transmitting the heat thereof to and heating the bit tip to an effective and continuous soldering temperature. This is accomplished by providing the heating unit with a maximum length of resistance wire in proportion to the size of said unit. The heating unit comprises a tubular body or carrier 24 of electric insulating and thermal conducting material, such as porcelain or other ceramic material, closed at one end, as at 25, and the outer surface of said closed end arranged with an arcuate recess 26 adjacent to and conforming to the contour of the periphery with the opposite ends spaced from each other and a pair of recesses extending inwardly from the space between the ends of the recess 26 to the center portion of said closed end with the portions of the recesses at said center portion of the closed end of greater width, as shown at 27 in Figures 2 and 10. The end of the side wall of the body 24 at the open end of said body is arranged with an annular recess 28, as shown in Figures 4 and 9.

A coil of electric resistance wire 29 is disposed in a series of passages circumferentially spaced around and extending longitudinally of the side wall of the body 24 and the present illustration of the invention shows two methods of arranging these passages in said side wall of the body.

As shown in Figures 1 to 4, inclusive, a series of grooves 30 are circumferentially spaced around and extend longitudinally of the inner surface of the side wall of the body 24 and having one end opening to the annular recess 28 and the opposite end of a pair of juxtaposed grooves in communication with openings in the end wall of the body at the outer end of the pair of recesses 27 and the opposite ends of the remaining grooves in communication with openings in the end wall of the body opening to the arcuate recess 26. The resistance coil is disposed in the grooves in a continuous sinuous path with the terminal portions extended into the pair of recesses 27, as shown at 31 in Figure 2, and portions of the coil extended through the successive grooves and about the alternate ends of the walls separating the grooves and disposed in the recesses 26 and 28, as shown at 32. The bore of the heater body 24 shown in Figures 1 to 4, inclusive, is greater than the diameter of the soldering bit shank 22 and the diameter of the heater body is less than the bore of the shell 12 to permit the engagement of the heating unit into the shell through the end arranged with the slots 15 with the annular recess 28 in the heater body juxtaposed to the inner end of the bushing 13 and the side and end walls of said body enclosing the soldering bit shank with the shank juxtaposed to the resistance coil 29 in the grooves 30. The coil 29 is electrically insulated from the bushing 13 and the soldering bit shank 22 by ceramic cement or refractory material covering the portions 32 of said coil in the annular and arcuate recesses 28 and 26, respectively, as shown at 33 in Figure 1. The portions of the coil in the grooves 30 are covered by a sheet of electric insulating and thermal conducting material 34, such as mica, having one end portion adjacent to the inner end of the bushing 13 and the opposite end portion engaged in an annular groove 35 in the inner surface of the closed end 25 of the heater body and said sheet retained in said insulating position by a tubular member 36 of suitable material, such as metal, having an inner diameter greater than the diameter of the soldering bit shank and of the same length as the length of the insulating sheet so that the ends of said member will be adjacent to the bushing 13 and engaged in the groove 35. The tubular member 36 will prevent the shank 22 from injuring the insulating sheet 34 and readily transfer the heat of the heating coil 29 to said shank.

Figures 8 to 10, inclusive, show a modified form of carrier for the coil wherein the circumferentially spaced and longitudinally extending passages for the heating coil consist of a series of bores 37 extending longitudinally through the side wall of the body 24 with one end of said bores opening to the annular recess 28 and the opposite end of a pair of juxtaposed bores opening through the end of the body to the pair of recesses 27 and the opposite ends of the remaining bores opening to the arcuate recess 26. The heating coil is engaged in the bores in a sinuous path with portions of the coil passing over an end of alternate wall portions separating the bores in the annular and arcuate recesses 28 and 26, respectively, to form curved or bent end portions in the coil similar to the portions 32 in the structure shown in Figures 1 to 4, inclusive, and the terminal portions of the coil terminating in the pair of recesses 27. In the structure shown in Figures 8 to 10, inclusive, the bore of the body 24 is of less diameter than the diameter of the bore of said body in the structure shown in Figures 1 to 4, inclusive, as it is not necessary to provide for the insulating sheet 34 and tubular member 36.

In both of the heater body structures illustrated, the pair of recesses 27, wherein the terminals 31 of the coil 29 are disposed, are closed in electric insulating condition in the shell 12 by a plate 38 of electric insulating material, such as porcelain, having an annular ridge extending from one face adjacent the periphery thereof and adapted to abut the outer surface of the closed end 25 of the heater body 24, as shown at 39 in Figure 1, to form with said recesses 27 a chamber to accommodate the connection of electric conductors 40 with the terminals 31 of the heating coil. The opposite face of the plate 38 is arranged with an integral tubular or perforated axial boss 41 of a length to extend through the opening 18 in the closure cap 17 and communicating with the chamber formed by said plate and the recesses 27 to permit the passage of the conductors 40 from the shell 12, as shown in Figure 1.

The heating unit and the insulating plate 38 are yieldingly retained against axial movement in the shell by a resilient member in the form of a spring washer member 42 having peripheral portions partially cut from the material thereof and extended from one face of the washer, as shown at 43 in Figure 7, so that the body of the washer is engaged on the outer face of the insulating plate in surrounding relation with the boss 41 and the extended portions 43 abutting the inner surface of the closed end of the closure cap 17, as shown in Figure 1.

To prevent corroding of the conductors 40 and take up strains and stresses imparted to the resistance or heating wire through the conductors, the terminals 31 of the heating wire are wound around the connecting ends of the conductors and a U shaped member 44 of suitable material, such as metal, is clamped over each of said connections, as shown in Figure 11.

To also prevent deterioration of the conductors 40 by the heat of the terminals 31 of the resistance wire 29, portions of the terminals 31 and the conductors 40 adjacent to and at the connections between said elements are engaged by a series of beads 45 of suitable insulating and high thermal conducting material, such as porcelain, as shown in Figures 1 and 2.

To facilitate the manipulation of the soldering bit mounted in the heating unit and shell relative to a piece of work to be soldered, the shell is adjustably mounted on a tubular handle or hand grip 46 by a pivoted bracket comprising a member having a pair of parallel arms 47 connected to each by a pair of comparatively narrow bands 48 integral with the arms and of arcuate shape in cross section extending in an arc of a circle of larger diameter than the circumference of the shell, and in order that said bands will have the least possible contact with the shell and the least possible transmission of heat from the shell to the bracket and handle, the bracket is secured to the shell at the bands 48 by pressing out nibs from the material of said band to project from the concave face thereof and welding or otherwise securing the nibs to the shell, as shown at 49, in Figure 1. The nibs will space the bracket member 47, 48 from the shell and thereby reduce the amount of heat transmitted from the shell to said member. To balance the assembled shell 12 upon the bracket 47, 48, said bracket is secured to the shell with the bracket nearer the end of the shell arranged with the closure cap 17, and to prevent the bracket interfering with the mounting of the closure cap on the shell the skirt of the closure cap is provided with the opening 20 to accommodate the band 48 of the bracket adjacent to said end of the shell, as clearly shown in Figure 1. The free end portions of the bracket arms 47 are rounded and arranged with alined openings for the pivotal mounting of the bracket arms within bifurcation 50 at one end of a tubular member 51 by a pin having a slotted head at one end, as shown at 52 in Figure 1, to facilitate tightening said pin after the bracket has been adjusted to desired angular relation with the tubular member. The tubular member 51 is mounted in the bore of the hand grip 46 with the bifurcation 50 projecting from one end of the hand grip. The hand grip is arranged with an annular guard 53 adjacent the end from which the tubular member 51 projects and a bulbous portion 54 intermediate the ends to form a hand grasping portion of the hand grip.

The portions of the conductors 40 having the heat distributing beads 45 thereon are extended through the tubular boss 41 of plate 38 and exterior of the housing said conductors are embraced in an electric insulating cable 55 and extended through the tubular member 51 into the hand grip where said conductors are connected to the usual flexible conductors extended from the end of the hand grip opposite the end having the tubular member mounted thereon, as shown at 56 in Figure 1, and said flexible conductors having the common attachment plug on the free ends thereof to permit connection of the heating coil 29 to a source of electric current.

To prevent stresses and strains from being imparted to the connections between the heating coil terminals 31 and the conductors 40 during the adjustment of the shell 12 to different angular positions relative to the hand grip 46, the conductors 40 are further enclosed by a coiled spring guard 57 having an enlarged end engaged within the closure cap 17 to abut the inner surface of the material around the opening 18 in said closure cap, as shown at 58, and the opposite end portion extended into the tubular member 51. To further take up said stresses and strains on the conductors 40 and retain the spring guard 57 in the tubular member 51, the portion of the spring guard adjacent the bifurcations 50 is embraced by a U shaped member 59 having the leg portions pivotally mounted on the pivot pin 52 within the bracket arms 47.

Having described my invention, I claim:

1. An electric soldering device including a tubular shell enclosing and carrying a tubular electric heating element, a soldering bit arranged on one end of a shank extended into the heating element in the shell with the bit projecting from one end of the shell, a closure cap removably mounted on the opposite end of the shell, electric conductors connected to the heating element and extended through an opening centrally in the closure cap, a tubular hand grip adapted for the engagement of the electric conductors in the bore thereof, a tubular member having a bifurcation at one end and the opposite end of said member engaged in the bore of the hand grip in surrounding relation to the conductors therein, a supporting member mounted on the shell and pivotally connected to the bifurcation of the tubular member to permit positioning the soldering bit into different angular positions relative to the hand grip, a guard embracing the conductors anchored at one end in the closure cap and the opposite end portion extended into the tubular member, and a U shaped guide member pivotally mounted between the bifurcation of the tubular member and embracing a portion of the guard adjacent the bifurcation of the tubular member.

2. An electric soldering device including a tubular shell enclosing and carrying a tubular electric heating element, a soldering bit arranged on one end of a shank extended into the heating element in the shell with the bit projecting from one end of the shell, a closure cap removably mounted on the opposite end of the shell, electric conductors connected to the heating element and extended through an opening centrally in the closure cap, a tubular hand grip adapted for the engagement of the electric conductors in the bore thereof, a tubular member having a bifurcation at one end and the opposite end of said member engaged in the bore of the hand grip in surrounding relation to the conductors therein, a supporting member mounted on the shell and pivotally connected to the bifurcation of the tubular member to permit positioning of the soldering bit into different angular positions relative to the hand grip, and a guard embracing the conductors and having an enlarged end engaged within the closure cap to abut the inner surface of the material of the closure cap around the central opening therein and the opposite end portion of the guard extended into the tubular member.

3. An electric soldering device including a tubular shell carrying a tubular electric heating element, a soldering bit arranged on one end of a shank extended into the heating element in the shell with the bit projecting from one end of the shell, a closure cap having a center opening and removably mounted on the opposite end of the shell, a plate of electric insulating material having a perforated boss extending from one face and slidably engaged in the shell with the face opposite the boss abutting the heating element and the boss projecting through the center opening in the closure cap, and electric conductors connected to the heating element and extended through the boss of the insulating plate exteriorly of the closure cap.

BENJAMIN P. McKINLEY.

REFERENCES CITED

The following references are of record in the file of this patent:

UNITED STATES PATENTS

| Number | Name | Date |
| --- | --- | --- |
| 1,533,230 | Colby | Apr. 14, 1925 |
| 1,810,164 | Fay et al. | June 16, 1931 |
| 2,159,041 | Moulthrop | May 23, 1939 |
| 1,928,522 | Amundsen | Sept. 26, 1933 |
| 1,704,413 | Wait | Mar. 5, 1929 |
| 787,047 | Leonard | Apr. 11, 1905 |
| 2,187,806 | Moulthrop II | Jan. 23, 1940 |
| 1,438,121 | McCloskey | Dec. 5, 1922 |
| 1,894,887 | Pingray | Jan. 17, 1933 |
| 2,198,646 | Wolcott | Apr. 30, 1940 |